Dec. 25, 1951 C. USCHMANN 2,579,770
FIBER DISPERSING MACHINE AND METHOD
Filed July 30, 1947 3 Sheets-Sheet 1
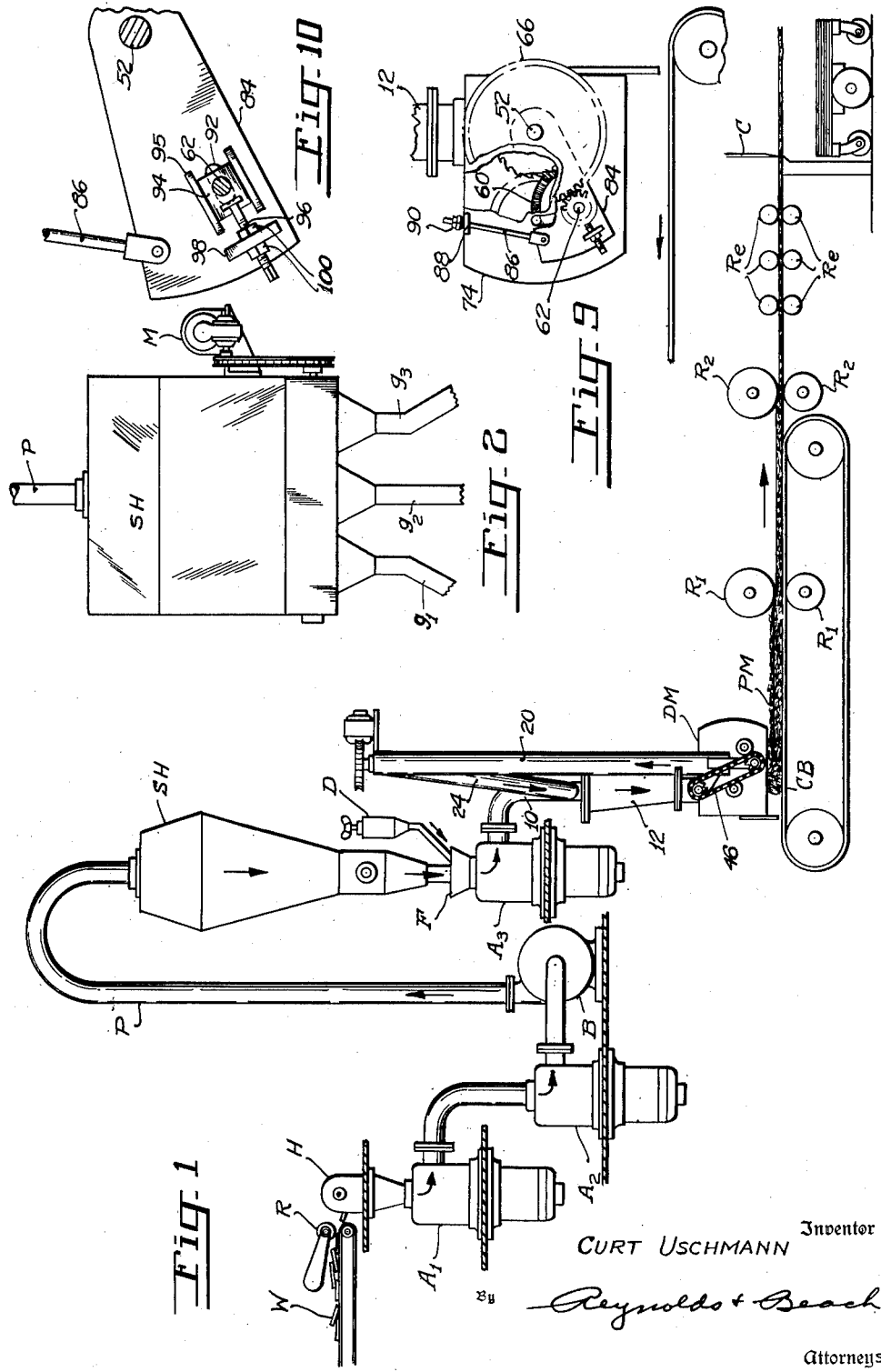
Inventor
CURT USCHMANN
By Reynolds & Beach
Attorneys Dec. 25, 1951      C. USCHMANN      2,579,770
FIBER DISPERSING MACHINE AND METHOD
Filed July 30, 1947      3 Sheets-Sheet 2
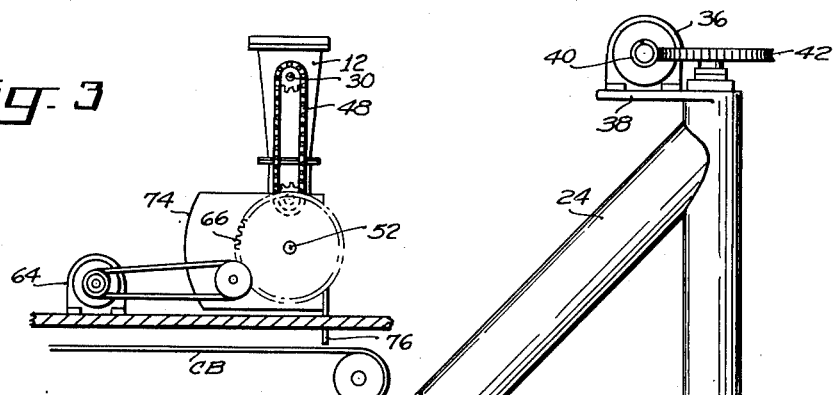
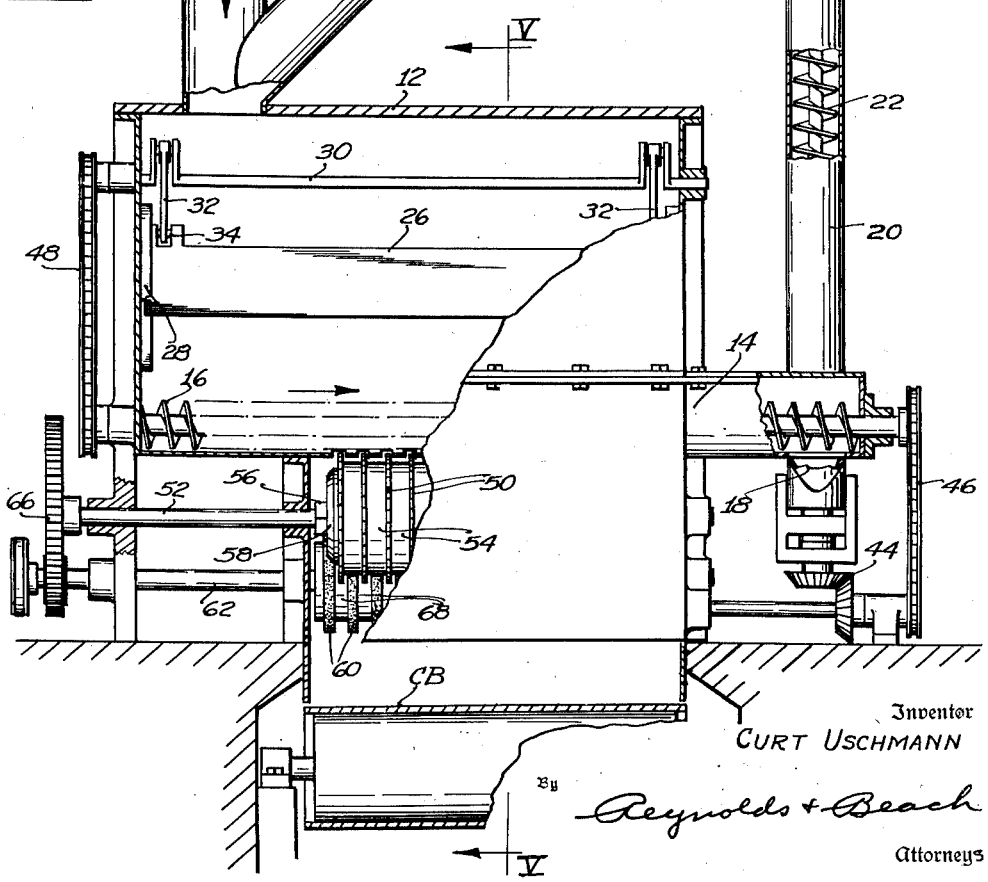
Inventor
CURT USCHMANN
By Reynolds + Beach
Attorneys

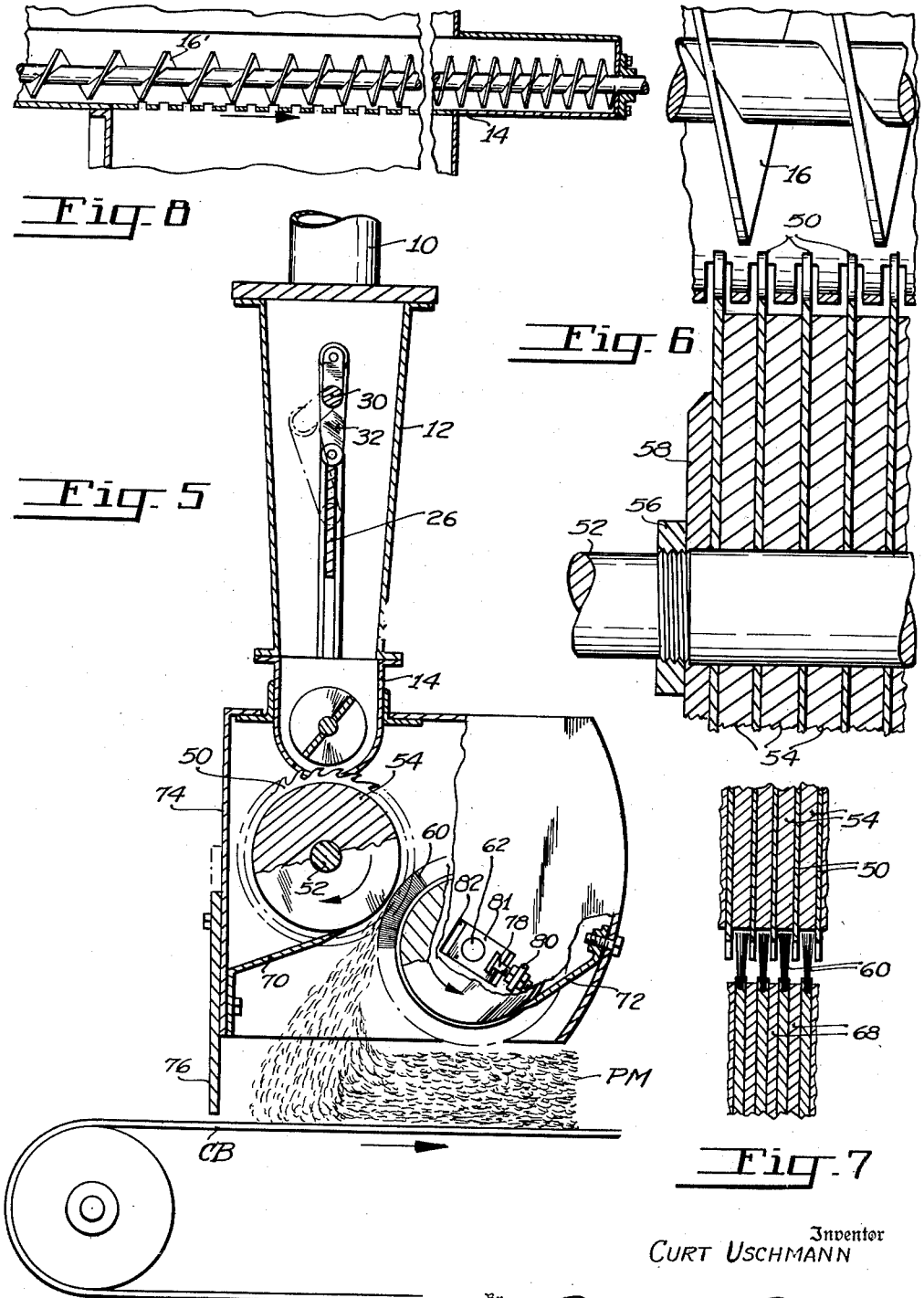

Patented Dec. 25, 1951

2,579,770

UNITED STATES PATENT OFFICE 2,579,770

FIBER DISPERSING MACHINE AND METHOD

Curt Uschmann, Lebanon, Oreg., assignor to Cascades Plywood Corporation, Portland, Oreg., a corporation of Delaware Application July 30, 1947, Serial No. 764,636

14 Claims. (Cl. 154—1)

This invention relates to improvements in apparatus and technique for the manufacture of synthetic lumber of the type produced from cellulose or ligno-cellulose fibers mixed with a suitable binder or binder reagent, and formed and consolidated into a heterogeneous mass by pressure, usually accompanied by heat applied to activate the binder. Material produced in this general way is already used widely in the field of building, as wallboard and side sheeting, and otherwise. The large number and diversity of the possible uses of synthetic lumber arise largely because of the great variety of physical characteristics that may be given to it by process control during manufacture. Among the characteristics readily controllable are the average density, surface or general hardness, surface ornamentation, and intrinsic strength. Moreover, because scrap wood, corn stalks, bagasse or any of a variety of waste cellulosic fibrous matter, herein designated generally as woody material, may be used in the manufacture of synthetic lumber, it is directly competitive with sawn lumber.

Since the raw materials used in the manufacture of synthetic lumber are procurable cheaply, it follows that processing accounts for most of the production cost. Particularly the techniques employed heretofore for handling the fibrous, woody material in arranging it in sheet form, beginning with the raw stock defibrated and mixed with binder, and concluding with the formed sheet, are time consuming and costly, inviting improvements such as of the type offered by the present invention. In a typical case, synthetic lumber manufacturing apparatus might well be operated economically, conjunctively with the operations of a plywood manufacturing concern or lumber mill, where quantities of waste wood are readily available as raw material.

After defiberizing the woody substance by a suitable grinding operation, adhesive may or may not be mixed with the fibrous material. In the mode of fabricating the fibrous material into a uniform mat prior processes have diverged, some employing a liquid (i. e. water) carrier medium to convey and distribute the material, and others forming a mat of the semi-dry material. Of these divergent methods the latter is inherently preferable, because of the large factor of cost and time required in removing the water and drying the final product in the first method.

Despite the opportunity for important gain by the second method, it has not heretofore been widely followed because of the difficulties encountered in handling the fibers and forming a uniform mat while in a semi-dry state. The considerations of this problem are essentially as follows: in the first place it is vital to a satisfactory final product that the density and thickness of the preliminary pile or mat deposited on a receiving surface be uniform. Otherwise, after it is consolidated and coalesced, while the resulting board may be of uniform thickness because the press platens or rolls are spaced apart uniformly, nevertheless its density will not be uniform. Consequently, the final board or sheet might be weak or soft in spots and hard and overpacked in others.

In accordance with the foregoing considerations a broad object of my invention is to provide a method and apparatus which makes practical on a production basis handling a fluffy fiber mass and forming of it the preliminary mat deposit. Such method and apparatus enables a producer to realize the economical benefits of processing semi-dry fiber materials into synthetic lumber or sheets on a continuous production basis, without requiring the conveyance and spreading of the fibers by liquid, or the converting of the mass into a pulpy condition before it can be suitably dispersed in forming a preliminary mat preparatory to final processing.

Another object of my invention is to provide fiber dispersing apparatus capable of dispersing controlled quantities of fluffy fiber or fiber and adhesive mixture at a predetermined rate uniformly over a receiving surface.

These and other features of my invention, including the various details of the construction and operation of its illustrated embodiment will now be considered with reference to the accompanying drawings.

Figure 1 is a simplified side elevation view of a system for manufacturing synthetic lumber sheets or boards in accordance with the illustrated practice of my invention.

Figure 2 is a fragmentary end elevation view of a portion of the apparatus, showing the distribution hopper from which are fed several processing units each including its own dispersing machine and conveyor system.

Figure 3 is a simplified fragmentary side elevation view of dispersing apparatus, showing the relation of the dispersing machine itself to a material-receiving and carrier belt viewed from the side opposite to that presented in Figure 1.

Figure 4 is a fragmentary end elevation view of the system showing particularly the fiber dispersing apparatus, with parts broken away, in its relation to the carrier belt and fiber supply mechanism.

Figure 5 is a vertical sectional view through the dispersing machine proper, taken along the line V—V of Figure 4.

Figures 6, 7 and 8 are detail fragmentary sectional views of different internal portions of the dispersing machine.

Figures 9 and 10 are detail views of adjustment features of the dispersing machine.

As a first step in the process of manufacturing synthetic lumber pieces of scrap wood or other woody material to be defibrated may be passed through a hog, for reducing them to chips or particles of reasonably small size for their subsequent introduction into an attrition type grinder mill wherein the chips or particles are initially defibered. Thus, as shown in Figure 1, wood scraps W, constituting exemplary woody raw material to be used in the process, may be conveyed by a belt to the mouth of a hog H positioned to receive the scraps as they pass beneath a leveling roll R coacting with the belt to restrict the flow of scrap material to the hog and prevent blockage of its entrance by piling up of material at that point. Suitable rotating grinder or cutter members within the hog H reduce the scraps to chips of convenient size which are allowed to fall into the receiving entrance of a first attrition grinder $A_1$. This grinder may be of the interplane type, such as that manufactured by the Allis-Chalmers Manufacturing Company of Milwaukee, Wisconsin.

In the grinder $A_1$ the chips are reduced to shreds by a tearing action taking place between opposing parallel corrugated disks, one disk being rotated and the other stationary, or both being rotated in opposite directions. The disks may be rotated at 1200 R. P. M., or thereabouts, the object being to further reduce the cross-sectional width of the chips coming through the grinder from the hog, while preserving as far as possible the length dimension of the chips. The resulting cellulose or ligno-cellulose shreds or fibers may vary in length from a fraction of an inch to over an inch, the grinding operation effectively tearing the fibers apart, rather than pulverizing them as most other types of grinders do.

The reduced fibers or shreds thus produced emerge by centrifugal force into an output pipe, preferably dropping abruptly into another attrition grinder $A_2$ in which the shreds or fibers are further reduced in thickness, if further reduction is desired. Following the second grinding operation, suction from a centrifugal blower B blows the further reduced fibers upwardly vertically through a blower pipe P which has a return vertical bend leading down into the top of a principal storage hopper SH. The storage hopper may be of such capacity as to enable it to supply material to several parallel lines of production machinery, each capable of producing the final synthetic lumber product.

In the illustrated case, the storage hopper is equipped to supply three such lines, part of one of which is described in detail herein, through the respective gravity chutes $G_1$, $G_2$, and $G_3$. Within the base of the storage hopper I may employ an agitator or spreader mechanism for distributing the fiber or shredded mass uniformly to the gravity chutes. The details of such a device are not shown, since it may comprise any suitable device, such as a screw or blade-type conveyor capable of conveying fibers outwardly toward the outer chutes from the central portion where they tend to fall in a pile from the centrally-located pipe P leading into the top of the hopper. The mechanism is shown to be driven by a drive motor M acting through a suitable chain and sprocket drive.

It is the preferred practice to incorporate a binder in liquid form with the fiber mass by introducing both constituents into the intake of an attrition grinder which performs the mixing or binder coating operation. While this mixing operation may be accomplished in one of the grinding stages described above, a further grinding operation for this purpose is preferred so that the fiber material in the hopper will have a minimum tendency to pack or lump. Such binder mixing operation still further reduces the cross-sectional size of the fibers. The third attrition grinder $A_3$, or mixing stage, representing the initial point of one of the three production lines, is supplied with fibrous material by one of the three gravity chutes. This grinder is equipped with a receiving funnel or rim F into which fibers from the storage hopper are dropped along with controlled quantities of binder, in either powder or liquid form, running into the funnel from a binder dispenser D. The binder dispenser may be of any suitable type, being adjustable to produce a rate of flow of binder into the funnel which bears a desired relationship to the quantity of fiber material delivered. In most cases a quantity of binder from five to twenty percent by weight of the fiber material is considered to be appropriate.

The resulting output of the grinder $A_3$ is an intimate, uniform mixture of finely divided fibers and binder, more in the nature of individual coatings of binder on the fibers. While it is entirely possible to manufacture synthetic lumber from fibers coated or mixed with solvent-activatable binders, in which case the material may be consolidated merely by pressure, I prefer to employ the heat-activatable type. Various well known binders of either type are generally suitable to the purpose, and it will be understood that the particular binder employed constitutes no part of this invention.

The fibers emerging from the attrition grinder $A_3$ pass into the apparatus which I may appropriately call the dispersing machine DM, constituting the principal element of my present invention. Into this machine the fibers are deposited in a fluffy mass. The amount of moisture in the fibers is limited to that normally present in the scrap material itself as it is fed into the hog in the early stages of the process, and any moisture present in the binder, if one is used, less that evaporated by the heat of the successive grinding operations.

Depositing the fiber mass initially in a uniformly thick layer of constant density is a necessary first step to final processing. Moreover, any device or method for accomplishing this desired end, in order to be practical, must be adapted for integration into a continuous, preferably fully automatic process. Therefore, not only must the dispersion or spreading of the fiber material into the preliminary mat be uniform, but the rate of delivery of the material must be controllable and constant. For instance, one of the most practical modes of transporting the preliminary mat to subsequent operating points is by a constantly moving carrier belt CB, which may be of any suitable construction, such as canvas having a rubber or other smooth, impervious surface. To lay a mat of uniform thickness on the belt while moving the belt past the material depositing machine, such machine must spread the material at a constant rate and uniformly over the width of the belt.

The problem of handling a mass of semi-dry fibers arises because, although carrying binder, it is quite light and fluffy. Nevertheless, the fiber material may be deposited by my novel dispersing apparatus on to the carrier belt in a uniformly constituted preliminary mat PM of loosely packed fibers of uniform predetermined thickness and density.

With reference to Figures 3 to 10, inclusive, the mixture of fibers and binder passing from the final attrition grinder A3 drops downwardly through an outlet pipe 10 leading into the top of a hopper 12 of the dispersing machine DM. This hopper, which is of elongated, narrow construction and relatively high, has an aperture in its cover plate receiving the lower end of the pipe 10, located near one end of the hopper. Preferably the hopper is flared gradually upward from its bottom which is rounded, forming a semi-cylindrical trough 14 extending throughout the length of the hopper proper and beyond one of its ends. A screw conveyor 16 received coaxially in the trough extends from the end of the hopper nearest to the location of the pipe 10, for the full length of the trough, passing through an end opening in the hopper into the extension of the trough adjoining such opening.

The rounded bottom of the hopper is slotted transversely at equal intervals, forming a row of outlet slits extending inwardly from a point near the end of the hopper through which the screw conveyor 16 passes, to a point between the ends of the hopper, preferably just beyond its mid-point. Material dropping into the hopper through the pipe 10 tends to pile up on the conveyor, which, when rotated, carries the deposited material progressively toward the opposite end of the hopper, sweeping it over the slots and keeping them covered with a bed of material of substantial thickness.

Each of the outlet slits in the bottom of the hopper receives the toothed periphery of a rotary disk 50, the teeth of which thereby project successively into the hopper as the disk rotates. The disks are commonly rotated by an arbor 52 appropriately journaled in the ends of the supporting framework of the machine. The arbor is thus disposed parallel to the row of apertures and the axis of the conveyor screw 16. The hopper slots are substantially wider than the disks so that their teeth pull or tear material from the fiber mass in the hopper, rather than cutting it. To maintain the disks centered in the apertures, they are spaced apart lengthwise of the arbor by spacer disks 54 and are held in this position by a lock nut 56 and end plate 58 bearing against the innermost disk and a similar plate against the endmost disk. The leading edges of the disk teeth are inclined forwardly and outwardly, as in the construction of a circular saw which the disks resemble, and as they are rotated in their slots the teeth sweeping through the bed of fibers overlying the slots extract successive wisps or bunches of fibers. New fibers constantly replace those extracted because of the continuous operation of the conveyor screw 16. Consequently the extraction of fibers by the disk teeth takes place in an uninterrupted process, as long as the hopper is adequately supplied.

By extending the trough, or hopper bottom and screw conveyor 16 beyond the end of the hopper as shown in Figure 4, the conveyor is enabled to carry appreciable quantities of material over and beyond the endmost toothed disk receiving slit, thereby insuring that that slit, like the others, will always be well covered with material for extraction purposes. Material carried beyond the end of the hopper, reaching the end of the trough extension 14, drops downwardly through an inclined short section of pipe 18 into a vertical conveyor tube 20. This tube contains a screw conveyor 22 adapted to lift the overflow or excess material upwardly through the tube to the point of its intersection with a downwardly inclined pipe 24 leading back to the hopper 12 when it joins the pipe 10 to redeposit into the hopper the material dropping down the pipe 24.

The resulting continuous feedback or recirculation through the hopper 12 of material not extracted through the outlet slots on a previous circuit not only keeps all slots well covered with fiber material, but maintains a constant agitation, preventing pileup or pocketing of material, and is deemed a convenient means for cleaning the hopper, by intercepting the overflow material at some point such as when is drops downwardly through the short section of pipe 18. In order to insure against the material bridging in the hopper, or the formation of air pockets within the mass, either of which might cause deficiency at one time or another in the supply of material to one or more of the outlet slits, I incorporate in the hopper an auxiliary agitator or tamping device which constantly works the material down, forcing it to drop into the depressions between ribs of the conveyor. The agitator or tamper comprises a vertically reciprocable plate or blade 26, the ends of which are guided for travel between pairs of parallel vertical guides 28 secured to the opposite end walls of the hopper. The blade is driven by a crankshaft 30, acting through a pair of connecting links 32 pin-connected to the plate near each of its ends, as at 34.

In the arrangement shown, the screw conveyors 16 and 22 and the crankshaft 30 act together, being driven by a single electric motor 36 supported on a horizontal bracket 38 fixed to the upper end of the vertical pipe 20. The conveyor screw 22 is driven by a worm gear 40 and wheel 42, such screw transmitting driving power to a pair of bevel gears 44 connected to its lower end, which in turn drive the horizontal conveyor screw 16 at one end through a chain drive 46. A second chain drive 48 connected to its other end rotates the crankshaft 30.

In Figure 8 a conveyor screw 16' of graduated pitch is shown, in place of the uniform pitch screw 16. The pitch of the screw 16' decreases gradually from the input end of the hopper to the output end, left to right in the figure. This may be a desirable refinement where it is found that the material used reduces too greatly in bulk, by reason of the extraction of material through the slits, and perhaps by compression and working, as it travels from one end of the hopper to the other.

The individual wisps of fiber material extracted from the hopper 12 through its slits by the toothed disks 50 are swept from the several disk teeth by the action of a series of brushes 60 commonly rotated by an arbor 62 parallel to the disk-arbor 52. The several brushes are spaced appropriately so as to be arranged alternately with the disks, each of the disks thus having its opposite sides swept by a pair of brushes. The peripheries of brushes and disks are overlapped, the brush fibers extending between the disks 50 approximately to the surfaces of the spacer disks (Figures 6, 7), in order to sweep away all of the collected material. By rotating the brushes in direction opposite to the rotation of the disks and at a peripheral speed several times greater, the collected fibers are literally flung downwardly and scattered onto the belt CB in a continuous stream.

By the time the fibers are carried by the disk teeth around to the brushes the notches between such teeth open downwardly, offering the least resistance to the action of the brushes sweeping past such notches tending to push the wisps of material out of them. In a practical case, the speed of the disk teeth might be in the order of from 100 to 1000 or higher lineal feet per minute, whereas the peripheral speed of the brushes may be five or six times greater. However, if the disk speed is too high it may result in cutting or pulverizing the fibers, or even in blowing the fibers in the slots upward out of the reach of the disk teeth. For driving purposes the disk and brush arbors may be geared together through gears 66 (Figure 4) of a relative size to effect the desired speed relationship between the disks and brushes, and connected to an electric driving motor 64.

While the depositing of fibers on the belt is effected uniformly across its width and at a substantially constant rate, the individual fibers fall haphazardly and become deposited in the mat pile with random fiber orientation. The resulting mat produced by this means, as the belt travels forwardly past the depositing point or line, is a loosely packed fluffy layer of crisscrossed fibers, when pressed into consolidation, will result in a board or sheet which is structurally isotropic, principally in the plane of the mat, giving it strength in all directions of flexure. Moreover, any tendency of the fibers to become packed in the hopper will not impair the results because wads will be broken up by the disk teeth and ultimately by the brushes in scattering the fibers over the belt.

The quantity of fibers extracted by the disk will depend upon their peripheral speed, the length and pitch of the teeth, their penetration into the mass of material lying over the apertures, the length of the apertures, and to some extent, upon the radius of the spacers 54 between disks. These spacers also act to prevent fibers from packing in the spaces between disks, insuring that all extracted fibers will be carried around to the brushes to be dispersed. The easiest way of controlling the rate of extraction of fibers from the hopper is to regulate the speed of the disks. This may be done readily in conventional manner by any suitable controller applied to the electric motor 64, which is so apparent as to require no further illustration, or by a mechanical speed control.

Spacer washers 68 are also provided between the several brushes. The disk spacers are cleaned by flexible scraper blades 70 pressed against them at such an angle as to deflect downwardly onto the belt any fibers by-passing the brushes. Similarly, the brush spacers may be scraped clean by scrapers 72. The brush and disk assembly is housed within an open bottomed casing or cubicle 74, the downwardly projecting sides of which and a downwardly projecting end baffle plate 76, constitute a housing laterally confining the pile of fibers deposited onto the carrier belt.

The spacing between the brush and disk arbors may be fixed, as shown in Figure 4, or adjusted within limits, as in Figure 5, to take up for wear of the brushes, by means of a T-bolt 78 interconnecting a fixed bracket 80 and a slide 81 carrying an end of the brush arbor. This slide projects beyond the casing face and is slotted to receive the head of the bolt 78. The position of the brush arbor may be varied by altering the position of a pair of lock-nuts threaded on the screw and engaging opposite sides of the bracket 80. To allow this adjustment of the arbor, the ends of the hopper have slots 82 receiving the slide 81. The arbor gears 66 permit a reasonable range of adjustment by their ability to operate with varying degrees of backlash.

As an alternative construction for supporting the brush arbor, whereby the height of the brush assembly may be varied in addition to its spacing from the disks, I may employ the arrangement of Figures 9 and 10. There, the brush arbor is journaled in sector plates 84 which are swingable about the brush-arbor axis. In order to elevate the brush assembly it is only necessary to shorten the length of rod 86 interconnecting the sector plate and a bracket 88 fixed to the cubicle 74, by taking up on the nut 90. Such an adjustment may be desirable accompanying a change in the speed of rotation of the disks and brushes, the thickness of the mat, or, generally, to find an optimum location of the brushes for a given set of conditions peculiar to a particular installation. The brush-spacer-disk scrapers 72 may be correspondingly adjusted at the same time by moving them up or down in a slot formed in the arcuately shaped end wall of the cubicle.

I may carry over into this brush-arbor support construction a similar adjustment for the takeup of the brushes as they wear, like that heretofore described. Thus, the brush arbor 62 may pass through slots 92 in the sector plate for journalling in bearing slide blocks 94 at either end of the arbor, which are guided for reciprocation between ribs 95. The slides are recessed or slotted to receive the heads of T-bolts 96. These bolts are passed through the brackets 98 projecting outwardly from the sides of the sector plates. Conjointly turning force nuts 100 on either side of the brackets will move slides 94 to adjust the position of the arbor 62 relative to the disk arbor 52. The bolts are then locked in any adjusted position by the force nuts 100.

Carrier belt CB may be driven by a variable speed drive mechanism (not shown) as a further means of controlling the thickness of the preliminary mat which is deposited on such belt; the faster the belt moves, the thinner the deposit becomes. The preliminary mat may then be advanced by the motion of the belt through a pair of compacting rolls $R_1$ which preliminarily compact the mat to a reduced thickness determined by the spacing between the belt and the upper roll $R_1$, giving the compacted layer certain rigidity because of interlocking of the fibers aided by any cohesion that may be present resulting from the tackiness of the plasticizer or binder. Upon passing through a succeeding pair of rolls $R_2$, the mat may be further reduced in thickness to approximately the thickness contemplated for the final synthetic board. The upper of rolls $R_1$ and $R_2$ may be driven by suitable mechanism synchronized with the motion of the carrier belt in order to prevent differential peripheral velocities of the belt and rolls, which would impair the results, causing piling up or tearing of the mat in front of or beneath the rolls. Synchronization may be accomplished in various known ways and is not described or illustrated in detail for that reason.

Heat activation of the binder and preliminary drying of the board simultaneously may be the next step, occurring between a series of pairs of high-frequency electrode rolls Re between which the mat or board is passed, where the heat is generated in the board by the dielectric heating effect of a high-frequency electric field extending between opposing rolls. For such purpose, the opposing electrode rolls may, therefore, be connected to the opposite terminals of any suitable source of high-frequency electrical energy, such as a conventional high-frequency oscillator operating at a frequency in the order of one hundred megacycles per second. During heating, the board may, if desired, receive an additional application of compacting pressure by the electrode rolls themselves; in any event the heating conditions the board to enable it to be cut into lengths by a cutting blade C and dropped onto a cart for transporting throughout the factory without danger of breakage or disintegration. It will be understood that other pressing and curing mechanism may be employed in conjunction with my dispersing machine in addition to or instead of that described.

It may be desirable in the manufacture of synthetic boards where heat and high pressure are required for setting the binder to employ a sheet metal caul placed on the carrier belt against which the material is compressed. In the present instance this technique may be employed by placing the end of a caul on the upper stretch of the carrier belt passing under the baffle plate 76 and allowing the carrier belt to transport the caul beneath the dispersing machine for the formation of a mat directly on the caul. In a continuous operation, successive cauls may be placed end to end on the belt and transported in this manner. When the final mat emerges from the apparatus, the mat will be cut into lengths, between adjacent ends of the successive cauls. Thereafter the mat sections may be transported about through the factory each on its caul, giving additional time for setting of the binder, in case that be necessary, before the formed sheet is handled alone, as for instance when the activation of binder is not completed by the electrode rolls Re. In addition, the use of cauls improves the smoothness or finish on the final product.

In a final step, the cut sections of board may, if desired, be inserted into a drier for a final curing operation, if further drying is necessary.

I claim as my invention:

1. In fiber dispersing apparatus, the combination of an elongated receptacle having a plurality of outlet apertures arranged in a row therein, a receiving surface beneath said receptacle, a plurality of toothed disks corresponding in number with the number of such apertures, rotatably received in said apertures and operable to extract through said apertures predetermined quantities of fibers from the general mass of fibers contained in said receptacle as said disks are rotated therein, a plurality of brushes coacting with said disks and rotatable at substantially higher peripheral speed than said disks operatively to sweep extracted fibers therefrom to scatter said fibers uniformly onto the receiving surface, and screw conveyor means located within said receptacle, which conveyor means is operable to move portions of the general mass of fibers contained within said receptacle continuously in a direction past said apertures, to maintain a supply of fiber material at said apertures.

2. In fiber dispersing apparatus, the combination of an elongated receptacle having a plurality of outlet apertures arranged in a row therein, a receiving surface beneath said receptacle, a plurality of toothed disks corresponding in number with the number of such apertures, rotatably received in said apertures and operable to extract through said apertures predetermined quantities of fibers from the general mass of fibers contained in said receptacle as said disks are rotated therein, a plurality of brushes coacting with said disks and rotatable at substantially higher peripheral speed than said disks operatively to sweep extracted fibers therefrom to scatter said fibers uniformly onto the receiving surface, screw conveyor means located within said receptacle, which conveyor means is operable to move portions of the general mass of fibers contained within said receptacle continuously in a direction past said apertures, to maintain a supply of fiber material at said apertures, and tamping mechanism disposed within said receptacle cooperable with said conveyor to tamp fibers between the ribs thereof in the vicinity of said apertures to afford uniformity in the supply of fibers to said apertures.

3. In an apparatus for manufacturing synthetic lumber from defibrated, fluffy woody material, the combination of a hopper for containing such material and having a series of openings formed at uniform spacing in the bottom thereof, a receiving surface beneath said hopper, fiber extracting mechanism operable to extract continuously from said hopper wisps of such material through such hopper openings and to shower such extracted wisps uniformly in a layer on said receiving surface, and conveyor means operable continuously to circulate and recirculate fiber material unidirectionally successively past said openings to maintain a supply of material at said openings.

4. The apparatus defined in claim 3, in which the conveyor means includes a screw conveyor operable to move masses of fiber material past the series of openings, and a second coacting conveyor positioned to receive material carried past the series of openings and operable to convey said material into position for recirculation by the first conveyor.

5. The apparatus defined in claim 3, in which the fiber extracting mechanism includes a plurality of toothed rotating members individually received in the hopper openings and rotatable together to extract wisps of material equally from the mass covering such openings for deposit onto the receiving surface.

6. The apparatus defined in claim 3, in which the fiber extracting mechanism includes a plurality of toothed rotating members individually received in the hopper openings and rotatable together to extract wisps of material equally from the mass covering such openings, and means operable to sweep such wisps from said toothed members and to scatter them uniformly over the receiving surface.

7. In an apparatus for manufacturing synthetic lumber from defibrated, fluffy woody material, the combination of a hopper for containing such material and having a series of openings formed at uniform spacing in the bottom thereof, a conveyor belt positioned below said hopper, said series of hopper openings extending widthwise of said conveyor belt, fiber extracting mechanism positioned at the bottom of said hopper and operable to extract continuously therefrom wisps of such material through such hopper openings and to shower such extracted wisps uniformly on said conveyor belt to form a uniform mat thereon, and conveyor means operable continuously to circulate and recirculate fiber material unidirectionally successively past said openings to maintain a supply of material at said openings.

8. In an apparatus for manufacturing synthetic lumber from defibrated, fluffy woody material, the combination of a hopper for containing such material impregnated with a heat-activatable binder and having a series of openings in the bottom thereof, a conveyor belt positioned below said hopper, said series of hopper openings extending widthwise of said conveyor belt, fiber extracting mechanism positioned at the bottom of said hopper and operable to extract continuously therefrom wisps of such material through such hopper openings and to shower such extracted wisps uniformly on said conveyor belt to form a uniform mat thereon, conveyor means operable to continuously circulate and recirculate fiber material unidirectionally successively past said openings to maintain a supply of material at said openings, pressing rollers coacting with said belt to compress said mat to a predetermined reduced thickness, and electrode rolls disposed in the path of said mat and operable to heat-activate the binder therein as the mat passes between said electrode rolls.

9. In mechanism adapted to deposit a uniformly thick fiber mat on a receiving conveyor belt moving past said mechanism and disposed receivably relative thereto, a storage hopper having an elongated trough-like bottom portion containing a row of parallel slots arranged along the length of the hopper, and transversely of the receiving belt, an intake opening in said hopper, through which fibers may drop thereinto, a screw conveyor received in said hopper bottom portion extending lengthwise thereof and outwardly beyond the end of said hopper, said conveyor operatively carrying fiber material over said slots and therebeyond, a second conveyor coacting with said screw conveyor to receive fiber material carried beyond the end of said hopper and to convey such material into position for the redepositing thereof through said intake opening into the hopper, and a row of toothed disks individually received rotatably in said slots and operable by rotation to extract fibers from said hopper through said slots.

10. In mechanism adapted to form progressively a uniformly thick fiber mat, a fiber-receiving conveyor belt, a storage hopper having an elongated trough-like bottom portion containing a row of parallel slots, arranged along the length of the hopper and transversely of the receiving belt, and fiber extracting mechanism coacting with said slotted hopper, including a disk-arbor disposed parallel to the row of slots, a row of toothed disks carried rotatably by said disk-arbor and individually received respectively in said slots, a brush-arbor disposed parallel to said disk-arbor, a plurality of brushes carried rotatably by said brush-arbor and respectively interengaging said disks, and means for rotating said arbors, said brush-arbor being rotated peripherally at least several times faster than said disk arbor to cause said brushes to sweep from said disks fibers extracted from said hopper, and to disperse said fibers over the conveyor belt to deposit a mat of fibers thereon progressively during travel of such belt.

11. Mechanism as defined in claim 10, in which the disks and brushes are spaced apart by cylindrical spacer washers of a diameter approaching respectively the diameter of the teeth-root circles of the disks and the base circles of the brushes.

12. In an apparatus for manufacturing synthetic lumber from defibrated, fluffy woody material, the combination of a hopper for containing such material and having a series of openings formed at uniform spacing in the bottom thereof, a receiving surface beneath said hopper, fiber extracting mechanism operable to extract continuously from said hopper wisps of such material through such hopper openings and to shower such extracted wisps uniformly in a layer on said receiving surface, and distribution means operable to move fiber material unidirectionally successively past said openings to maintain a supply of such material at all of said openings.

13. In an apparatus for manufacturing synthetic lumber from fluffy defibrated woody material, the combination of a receiving surface, a container for such material disposed above said receiving surface, and having a row of openings in the wall thereof, a plurality of dispersing elements movable through said container openings and operable to extract through said openings wisps of such material and to deposit them on said receiving surface, and distributing means operable to move such fiber material lengthwise of such row of openings to maintain a supply of such material at all of said openings.

14. The method of making fiberboard including forming a thick mat of substantially uniform density from fluffy fibrous material, which comprises moving an amorphous mass of such material in a substantially horizontal direction, moving a receiving surface substantially perpendicular to such direction of movement of the amorphous mass of material but also in a substantially horizontal direction and beneath such mass, and stripping wisps of the fluffy fibrous material from such amorphous mass in a direction crosswise of its substantially horizontal direction of movement, and depositing such wisps on the receiving surface until a mat of the desired thickness is built up.

CURT USCHMANN.

REFERENCES CITED

The following references are of record in the file of this patent:

UNITED STATES PATENTS

| Number | Name | Date |
|---|---|---|
| 67,048 | Harrington | July 23, 1867 |
| 1,336,402 | Weiss | Apr. 6, 1920 |
| 1,375,985 | Vardell | Apr. 26, 1921 |
| 2,217,538 | Carson | Oct. 8, 1940 |
| 2,288,072 | Collins | June 30, 1942 |
| 2,447,161 | Coghill | Aug. 17, 1948 |